(12) United States Patent
Flug et al.

(10) Patent No.: US 11,226,205 B2
(45) Date of Patent: Jan. 18, 2022

(54) METHOD AND DEVICE FOR REDUCING INTERMEDIATE POINTS IN A POLYGON

(71) Applicant: Continental Automotive GmbH, Hannover (DE)

(72) Inventors: Christian Flug, Hannover (DE); Rares Chiorean, Hannover (DE); Mihaela Breaban, Hannover (DE); Paul Schott, Hannover (DE)

(73) Assignee: Continental Automotive GmbH

( * ) Notice: Subject to any disclaimer, the term of this patent is extended or adjusted under 35 U.S.C. 154(b) by 142 days.

(21) Appl. No.: 16/603,010

(22) PCT Filed: Mar. 28, 2018

(86) PCT No.: PCT/EP2018/057975
§ 371 (c)(1),
(2) Date: Oct. 4, 2019

(87) PCT Pub. No.: WO2018/184952
PCT Pub. Date: Oct. 11, 2018

(65) Prior Publication Data
US 2020/0033142 A1 Jan. 30, 2020

(30) Foreign Application Priority Data
Apr. 7, 2017 (EP) .................................... 17465511

(51) Int. Cl.
*G01C 21/32* (2006.01)
(52) U.S. Cl.
CPC .................. *G01C 21/32* (2013.01)
(58) Field of Classification Search
CPC ...................................................... G01C 21/32
USPC ......................................................... 702/150
See application file for complete search history.

(56) References Cited

U.S. PATENT DOCUMENTS

| 6,674,434 B1 | 1/2004 | Chojnacki et al. | |
|---|---|---|---|
| 2010/0082248 A1* | 4/2010 | Dorum ................... | G01C 21/36 701/533 |
| 2013/0142453 A1* | 6/2013 | Kandal ................... | G01C 21/32 382/300 |
| 2013/0328937 A1 | 12/2013 | Pirwani et al. | |

(Continued)

FOREIGN PATENT DOCUMENTS

| CN | 106197440 A | 12/2016 |
|---|---|---|
| EP | 2418460 A2 | 2/2012 |

(Continued)

OTHER PUBLICATIONS

European Search Report dated Sep. 25, 2017 from corresponding European Patent Application No. 17465511.8.

(Continued)

*Primary Examiner* — Ricky Go (57) ABSTRACT

One aspect relates to a method for reducing intermediate nodes in a polygonal chain with one or a plurality of intermediate nodes of a set of intermediate nodes between a starting node and an end node. In addition to the attributes of longitude and latitude, at least one further attribute with an attribute value and an attribute direction of a set of further attributes is assigned to the starting node, the end node and every intermediate node of the set of intermediate nodes. The attributes can be a gradient, a curve-radius or an altitude.

16 Claims, 5 Drawing Sheets

(56) References Cited

U.S. PATENT DOCUMENTS

2015/0161438 A1\* 6/2015 Geringer ................. G06T 17/05
                                                            382/113
2017/0323368 A1\* 11/2017 Eastman ............. G06F 16/9537

FOREIGN PATENT DOCUMENTS

| JP | 2001201358 A | 7/2001 |
| JP | 2006018022 A | 1/2006 |
| JP | 2007072011 A | 3/2007 |
| JP | 2013007889 A | 1/2013 |
| JP | 2013140246 A | 7/2013 |
| JP | 2017146530 A | 8/2017 |

OTHER PUBLICATIONS

International Search Report and Written Opinion dated May 11, 2018 from corresponding International Patent Application No. PCT/EP2018/057975.

\* cited by examiner

METHOD AND DEVICE FOR REDUCING INTERMEDIATE POINTS IN A POLYGON

BACKGROUND

The invention relates to the field of driving assistance systems. The invention relates in particular to a method and a device for complexity reduction of map data represented by means of polygons for an electronic horizon application.

Modern motor vehicles have a multiplicity of different driving assistance functions which assist the driver in planning routes or in guiding the vehicle. ADAS (Advanced Driver Assistance Systems) have been developed to increase the comfort, efficiency, safety and driver satisfaction when driving. These are supplementary electronic devices in motor vehicles which assist the driver in particular driving situations. ADAS's relate, for example, to adaptive headlamp settings, adaptive speed control, warnings when leaving the traffic lane, curve warnings, speed limit warning. ADAS's here access, partially or fully autonomously, the drive, control or signaling equipment of the vehicle, and warn the driver through appropriate human-machine interfaces shortly before or during critical situations. Some ADAS's here use a range of sensors such as RADAR, infrared, ultrasonic and optical sensors such as digital video cameras and LIDAR.

Some ADAS's use digital map data. The digital map supplies, in particular, information about the road network, the road geometry, road conditions and the terrain surrounding a vehicle. Digital map data supply valuable information that cannot be captured by means of sensors, such as the curvature, gradient, speed limits that are not displayed, traffic lane boundaries etc. In addition to this, a certain prediction function that goes beyond the capture possibilities of sensors or the view of the driver belongs to a digital map.

ADAS's that require digital map data usually use a geographic database that is associated with the navigation system of the vehicle. This database of the navigation system contains data for representing a road network in a region, in particular the geographic data including the altitude of roads, road junctions, turning restrictions at road junctions, road names, and speed limits.

The database of the navigation system can contain more data than are necessary for an ADAS application. An application of this sort can be an eHorizon application that determines an electronic horizon. An electronic horizon is an assembly of roads and road junctions that extend from a current vehicle position to an extent that is determined by an eHorizon application. The assembly of roads and road junctions is made up of potential paths that the vehicle can follow from the current position. As a rule, an eHorizon system can only process map data with a limited degree of complexity, while on the other hand the map data must also satisfy accuracy requirements.

Map data can be represented by means of geometric figures such as polygons in two-dimensional space or polyhedrons in three-dimensional space. A polygon, or a polygonal chain, can here be defined as a set of connected segments that yield a form. A polygon can also be defined by a set of nodes that yield a form when they are connected by segments. A polygon can also be defined by a set of segments and nodes that yield a form when they complement each other. A node is a point at which two segments meet. A polygon can be described with an arbitrary number of nodes. Two segments that meet at an angle of 180° form a larger segment that includes the two segments. A segment is thus a connection or an edge of two points.

Road networks can be described by nodes and edges, where a road segment is bounded by a starting node and an end node, and the edge can comprise a detailed geometrical shaping such as a curvature. The detailed geometric shaping comes about through intermediate nodes (control nodes or shape points). The nodes and intermediate nodes are described by latitude (geographic latitude) and longitude (geographic latitude), and thus by their position. The nodes can in addition be described through the attributes of gradient, altitude and curve-radius. A road segment can comprise a plurality of curves. A road segment can be described by B-splines or cubic. Bezier curves. A Bezier curve is described by four control nodes, wherein the last control node of a preceding Bezier curve is the same as the first control point for the following Bezier curve.

A road segment can be approximated by polygons. In this case, a road segment consists of a plurality of connected segments, whose arrangement is defined by the nodes and intermediate nodes, with at least the additional attribute of altitude.

If an eHorizon system uses map data that are represented by polygons, altitude information may become a necessity, for example in order to regulate the drive of the vehicle when driving up and down hills. The maps must not, on the other hand, be too complicated, meaning that the number of intermediate nodes must not be unnecessarily high, in order to guarantee real-time processing.

Methods are known in the prior art for simplifying polygons or polygonal chains. The methods serve for curve-smoothing and the generalization of maps. These are referred to below as line generalization methods. One class of line generalization methods considers a polygon as a whole, and progresses to finer approximations.

One known line generalization method of this sort is the 2D Douglas-Peucker algorithm, whose aim is to simplify a polygonal chain given by a sequence of points by omitting individual points in such a way that the basic form is retained. The initial polygon is divided for this purpose into two segments which for their part then pass through the algorithm. It is thus a recursive method.

Figure 1:
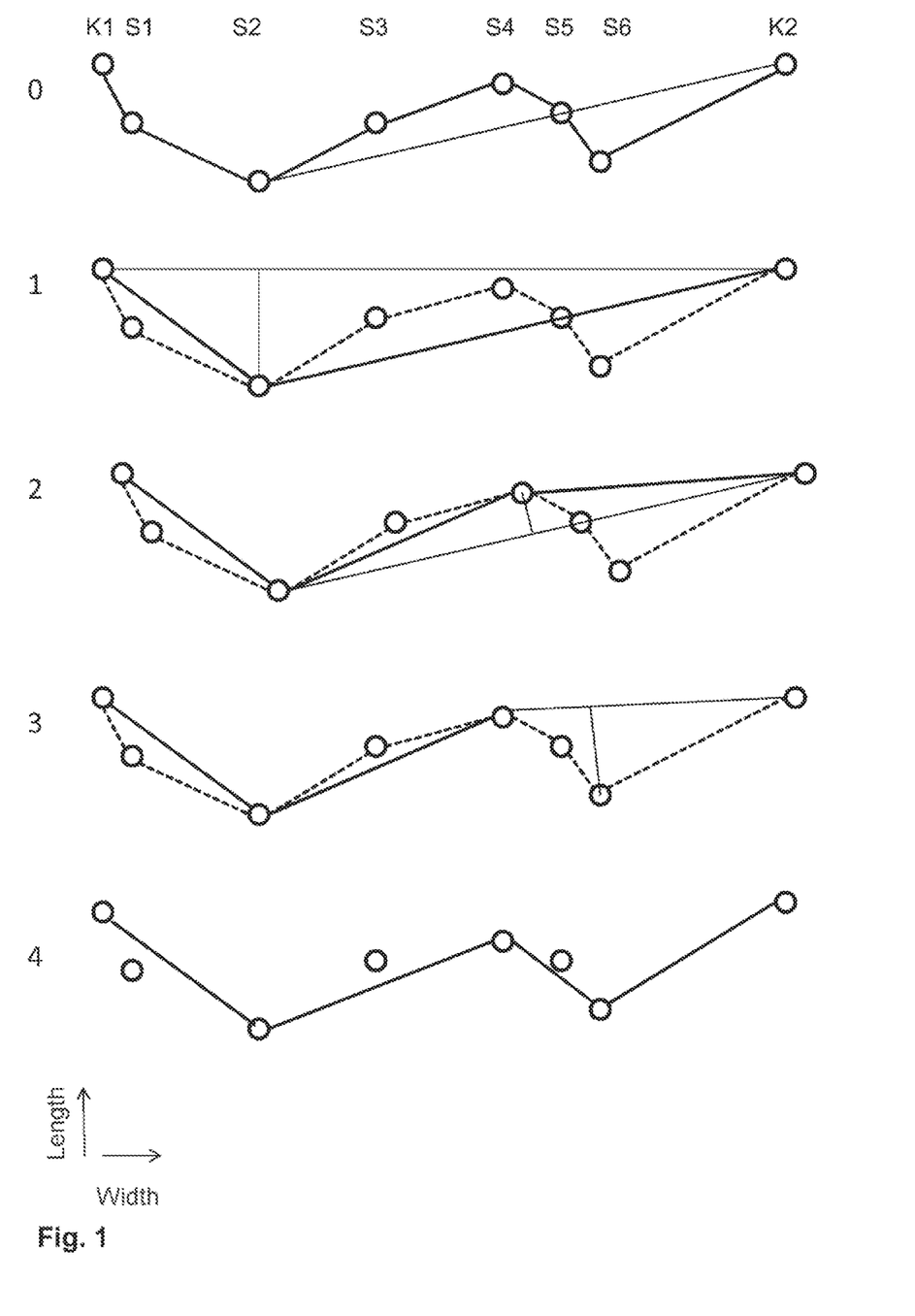
FIG. 1 shows method stages of the Douglas-Peucker algorithm applied to a polygon.

The 2D Douglas-Peucker algorithm is described with reference to FIG. 1 which shows a polygon in its initial form 0 and in the different stages of approximation 1 to 4, with a total of n=8 nodes. A segment between the starting node K1 and the end node K2 is considered as a first approximation. To check whether this approximation is adequate, the intermediate node from amongst the n−2 intermediate nodes that has the greatest distance from the segment between K1 and K2 is searched for. At approximation stage 1, this is S2, with the distance illustrated as a perpendicular. If this distance is smaller than a tolerance, the approximation is adequate, and all the other intermediate nodes can be discarded. That is not the case here. S2 is therefore retained, and the approximation is refined.

As a second approximation, a segment between K1 and S2 is considered, as is a segment between S2 and K2. It will certainly be found here that S1 has a distance from the segment between K1 and S2 that is smaller than the tolerance. S1 can be discarded. The node with the greatest distance from the segment between S2 and K2 is S4. The distance is greater than the tolerance. The segment between S2 and K2 must therefore be refined further.

The third approximation consists of a segment between K1 and S2, a segment between S2 and S4, and a segment between S4 and K2. An investigation is made as to whether this approximation is adequate in the third approximation stage. This is not the case for the segment between S4 and K2, since the distance from S6 to this segment exceeds the tolerance. This segment must consequently be refined further.

The result can be seen in the fourth approximation stage with a fourth approximation with a segment between K1 and S2, a segment between S2 and S3, and a segment between S4 and S6, as well as a segment between S6 and K2.

The Douglas-Peucker algorithm is thus a two-dimensional line generalization method, wherein only the latitude and longitude of sequential intermediate nodes are considered.

The restriction to these attributes however does not satisfy the requirements of an electronic horizon. The required tolerances for gradient, curve-radius and altitude can in particular not be guaranteed, since these are not considered at all in the two-dimensional Douglas-Peucker algorithm.

BRIEF SUMMARY

It is therefore the object of the invention to give a method and an apparatus for reducing intermediate points that satisfy the requirements of an eHorizon application.

This object is achieved with a method according to the independent method claim and a device according to the independent device claim. The dependent claims relate to advantageous configurations.

One aspect relates to a method for reducing intermediate nodes in a polygonal chain with one or a plurality of intermediate nodes of a set of intermediate nodes between a starting node and an end node. In addition to the attributes of longitude and latitude, at least one further attribute with an attribute value and an attribute direction of a set of further attributes is assigned to the starting node, the end node and every intermediate node of the set of intermediate nodes. The attributes can be a gradient, a curve-radius or an altitude. In one or more processors, for each intermediate node starting from the starting node, the following method steps are carried out: comparing the attribute direction of the at least one further attribute of an intermediate node with the attribute direction of the at least one further attribute of the immediately preceding node; marking the intermediate node as a significant node if the comparison yields a direction change of the attribute direction; and applying a line generalization method with reference to the longitude and latitude attributes, wherein the intermediate nodes that are marked as significant nodes may not be removed. The line generalization method can, in particular, be the Douglas-Peucker algorithm.

Assuming that the polygonal chain models a straight segment of road that has a specific altitude profile, i.e. in addition to the attributes of latitude and longitude, a value for the altitude is additionally assigned to each node and intermediate node. A direction change with respect to the attribute of altitude means that the altitude value of the intermediate node concerned must relate to an at least local altitude maximum or an at least local altitude minimum. If the Douglas-Peucker is applied to a road segment that is straight in terms of the attributes of latitude and altitude, without taking into account intermediate nodes that have been classified as significant, there remains a single segment between the starting node and the end node, since, in the case of a straight road segment, there is precisely no variation perpendicular to the connection between the starting point and end point. All the intermediate nodes are eliminated, and with these also all the altitude information that is relevant for an ADAS. Because at least those intermediate nodes at which an at least local altitude minimum or an at least local altitude maximum is present are marked as significant, and these must not be removed by the Douglas-Peucker algorithm, the most important altitude information is retained.

A direction change is defined in relation to the immediately preceding node.

A direction change relating to the attribute of gradient is defined as from an upward gradient to a downward gradient or from a downward gradient to an upward gradient.

A direction change for the curve-radius is defined as from a curve-radius to the left to a curve-radius to the right, or from a curve-radius to the right to a curve-radius to the left.

A direction change for the altitude is defined as a rising altitude to a falling altitude or a falling altitude to a rising altitude.

In addition to the tolerance that is considered in the Douglas-Peucker algorithm with respect to longitude and latitude, and the direction changes of further attributes, the method can also be supplemented by a tolerance consideration relating to the further attributes.

According to one aspect, prior to application of the line generalization method, the following method steps are carried out in addition in one or more processors, for each intermediate node of the set of intermediate nodes, starting from the starting node: Determining a difference between the value of the at least one further attribute of an intermediate node and the value of the at least one further attribute of a preceding node, wherein the preceding node is a proximate preceding starting node or a proximate preceding intermediate node that has not yet been removed; marking the intermediate node as a significant node if the difference exceeds a threshold value, otherwise removing the intermediate node from the set of intermediate nodes.

Only such intermediate nodes at which the difference between the gradient, altitude or curve-radius in comparison with the preceding node remains below a threshold value are thus removed from a gradient profile, an altitude profile or a curve profile, wherein the preceding node is a starting node or an intermediate node that has not yet been removed.

According to a further aspect, prior to application of the line generalization method, the following method steps are carried out in addition in one or more processors, for each intermediate node of the set of intermediate nodes, starting from the starting node: determining a first difference between the value of the at least one further attribute of an intermediate node and the value of the at least one further attribute of a preceding node, wherein the preceding node is a proximate preceding starting node or a proximate preceding intermediate node that has not been removed; determining a second difference between the value of the at least one further attribute of the immediately succeeding node and the value of the at least one further attribute of the intermediate node; determining a difference between the first difference and the second difference; and marking the intermediate node as a significant node if the difference exceeds a threshold value, otherwise removing the intermediate node.

The at least one additional attribute can, in particular, be an altitude. The gradient of the segment between intermediate nodes and preceding nodes, and the gradient of the segment between subsequent nodes and intermediate nodes, are thus determined. The difference of these segment gradients is compared with the threshold value, i.e. the greatest possible tolerance.

According to a further aspect, prior to application of the line generalization method, the following method steps are carried out in addition in one or more processors, for each intermediate node of the set of intermediate nodes, starting from the starting node: determining a first difference between the value of the at least one further attribute of an intermediate node and the value of the at least one further attribute of a preceding node, wherein the preceding node is a proximate preceding starting node or a proximate preceding intermediate node that has not been removed; determining a second difference between the value of the at least one further attribute of the immediately succeeding node and the value of the at least one further attribute of the preceding node; determining a difference between the first difference and the second difference; and marking the intermediate node as a significant node if the difference exceeds a threshold value, otherwise removing the intermediate node.

The at least one additional attribute can, in particular, be an altitude. The gradient between intermediate nodes and preceding nodes, and the gradient between subsequent nodes and preceding nodes, are thus determined. The difference between these gradients is compared with the threshold value.

According to one aspect, several attributes of the set of further attributes can be considered in the same way as described above.

One aspect relates to a method for reducing intermediate nodes in a polygonal chain with one or a plurality of intermediate nodes of a set of intermediate nodes between a starting node and an end node, wherein, in addition to the attributes of longitude and latitude, at least one further attribute with an attribute value and an attribute direction of a set of further attributes is assigned to the starting node, the end node and every intermediate node of the set of intermediate nodes, in one or more processors, for each intermediate node, the starting node, the following method steps are carried out starting from.

Comparing the attribute direction of the at least one further attribute of an intermediate node with the attribute direction of the at least one further attribute of the immediately preceding node; marking the intermediate node as a significant node if the comparison yields a direction change of the attribute direction; applying a line reduction method with reference to the at least one further attribute, and a projection of the polygonal chain either onto the longitude or the latitude, wherein the intermediate nodes marked as significant must not be removed; marking intermediate nodes remaining after application of the line reduction method as significant nodes; and applying the line generalization method with reference to the longitude and latitude attributes, wherein the intermediate nodes that are marked as significant nodes must not be removed.

As soon as a direction change of an attribute direction, the corresponding intermediate node is marked as a significant node. The significant node must not be removed during application of the two following line generalization methods. The line generalization method with respect to the at least one further attribute and the projection of the polygonal chain onto either the longitude or the latitude is used for the further determination of significant nodes which must not be removed in the following line generalization method with respect to the longitude and latitude.

The at least one further attribute is the altitude. The line generalization method is the Douglas-Peucker algorithm. This means that the Douglas-Peucker algorithm is first applied to the altitude profile, wherein, according to the method, the removal of at least local altitude maxima or of at least local altitude minima is ruled out. The remaining intermediate nodes are necessary in order to accurately represent the altitude profile, and must not be removed in the further method. The altitude profile describes the altitude against the projection of the polygonal chain either onto the latitude or the longitude. The Douglas-Peucker algorithm is now applied once again, but this time with respect to the longitude and latitude, wherein, in addition to the significant intermediate nodes resulting from direction changes, the significant intermediate nodes determined through the application of the Douglas-Peucker algorithm with respect to altitude and projection must not be removed either. This results in a polygonal chain which is optimally reduced in terms of longitude and latitude and which nevertheless provides sufficiently accurate altitude information for an electronic horizon.

One aspect relates to a device with a processor that is configured to execute a method as described above. The method can be represented in program instructions that the processor carries out.

BRIEF DESCRIPTION OF THE FIGURES

The invention will be described below on the basis of exemplary embodiments and with reference to figures. Here.

DETAILED DESCRIPTION

Figure 2:
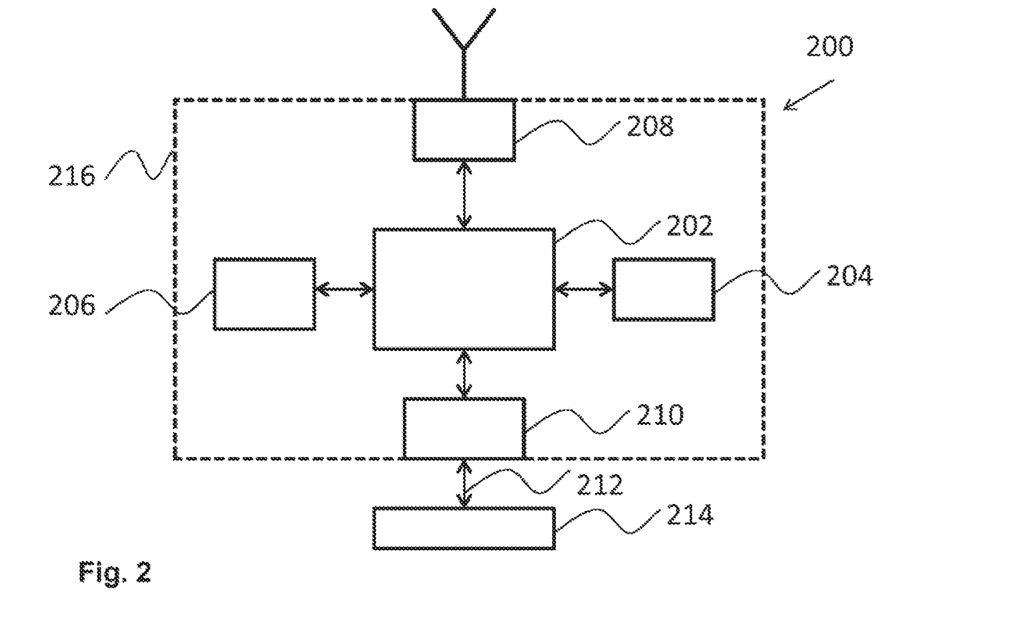
FIG. 2 shows a block diagram of an ADAS architecture.

FIG. 2 shows a block diagram of an ADAS architecture 200. The ADAS architecture 200 has a map and positioning engine 204 and driver assistance applications 214. The map and positioning engine 204 can be a single module; or it can be divided into various packages. It can also be integrated into other packages such as a sensor package. The map and positioning engine 204 comprises a processor 102, a positioning system 204, a map database 206, a communication system 208 with a communication interface for mobile communication in particular and a data bus interface 210. The processor 202 receives data from the positioning system 204, the map database 206, the communication system 208 and the data bus interface 210, and processes these by means of software programs or software applications, of which some are described further below with reference to FIG. 3.

The processor 202 provides processed data over the data bus interface 210 and the data bus 212 to the driver assistance applications 214. One of the driver assistance applications 214 can be an electronic horizon. The positioning system 214 uses (WS technology and a gyroscope, and can furthermore comprise sensors for detection of the vehicle speed, direction, orientation etc. The positioning system 214 makes this information available to the processor 202. Some of the software applications running on the processor need this information.

The geographic map bank 206 contains map data, as are usual for a navigation system. The map data contain in particular data relating to roads and road junctions in the form of road segments between a starting node and an end node and a geometric shaping by means of intermediate nodes between starting node and end node. The road segments can be modeled as polygons.

Figure 3:
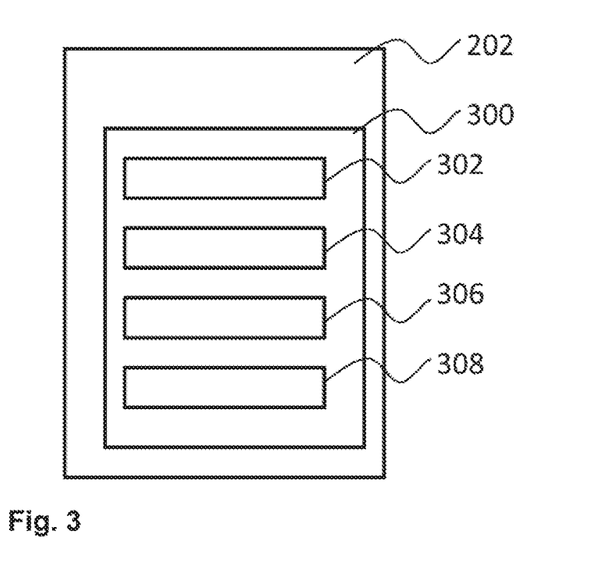
FIG. 3 shows a block diagram of possible software applications in the ADAS architecture.

FIG. 3 shows a block diagram with various software applications 300 that can run on the processor 202. The software applications contain a map access application 302, a map update application 304, a vehicle positioning application 306 and an eHorizon application 308.

The map access application 302 provides map access data of the geographic map database 206. The map access application 302 receives a query from the processor 202 for a map extract, and calls the map extract up by means of the map access data in the geographic map database 206.

The map update application 304 serves to update the geographic map database 206. Map extracts that no longer contain any current map data can be exchanged. The geographic map database 206 can moreover be extended with further map extracts. The map update application provides a communication channel for this purpose between the communication system 208 and the geographic map database, via which the current map data can be transferred.

The vehicle positioning application 306 determines the position of the vehicle relative to the road network which is represented by the geographic map database 206. The vehicle positioning application 306 uses the positioning data generated by the positioning system 204, and compares these with the map data from the geographic map database 206 by means of a map comparison algorithm.

The eHorizon application 308 calculates an electronic horizon. It uses map data from the electronic map database 206 for this purpose. The map data, however, are present with a complexity that is too great for the eHorizon application, since this should calculate an electronic horizon in real time. The complexity of the map data must therefore be reduced, but nevertheless satisfy certain requirements for accuracy. A complexity reduction of this sort of a road segment modeled by a polygonal chain is described below with reference to FIG. 4, FIG. 4 a) shows a sectional diagram 400 of a terrain with a road that runs straight between the starting point K1 and the end point K2, along which a vehicle 402 is moving. The road runs in the direction of a line of latitude, and thus exhibits no variation in the direction of a line of longitude. The road is not, however, flat, but passes over a hill. The road thus has an altitude profile. The road is to be modeled by a polygon, whose starting node K1, intermediate nodes Z1, Z2, ..., Z8 and end node K2 are illustrated in plan view, FIG. 4 b) shows the associated polygon with the associated arrangement of the intermediate points in the sectional view. The polygon has a global maximum at the intermediate node Z4. The segment between the intermediate nodes Z4 and Z5 models a top of the hill. The segment between the intermediate nodes Z5 and Z6 has a strong downward gradient.

Through applying the 2D Douglas-Peucker algorithm with reference to the attributes of longitude and latitude to the polygon, the altitude information would be entirely lost, since the road runs straight, and all intermediate nodes Z1, Z2, ..., Z4 would be removed. Since the altitude information is relevant in an electronic horizon, significant altitude information should be retained.

The processor 202 examines whether there is a change in the altitude direction, i.e. whether a direction change is present in the segment gradient, for each intermediate node Z1, Z2, ..., Z4. That is the case here for intermediate node Z4, since this represents a local altitude maximum. The intermediate node Z4 is marked as a significant node, and must not be removed during later application of the Douglas-Peucker algorithm with reference to the attributes of longitude and latitude. The local maximum of the altitude profile is thus initially conserved.

Figure 4:
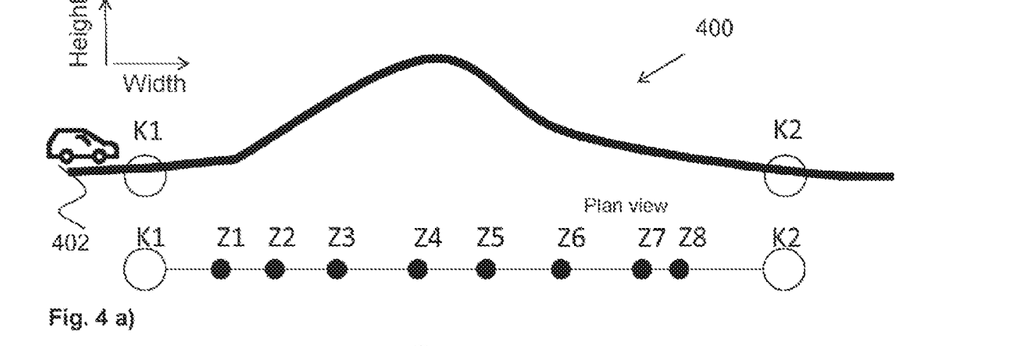
FIG. 4 shows a section of terrain modeled by a polygon.

The conservation of local maxima or minima of the altitude profile can, however, not be sufficient for an electronic horizon. A more accurate modeling of the altitude profile is, for example, necessary for a drive controller. Further intermediate nodes should therefore be marked as significant nodes, so that these are not removed when the Douglas-Peucker algorithm is applied with reference to the attributes of altitude and longitude. The examination of the intermediate nodes and the potential marking of said nodes are performed by the processor 202 in FIG. 2 which examines, for example, a change in the segment gradient. This is explained with reference to FIG. 4 b).

The first intermediate node starting from the start node K1 is considered initially for this purpose. The first intermediate node is intermediate node Z1. The gradient of the segment between K1 and Z1 is compared with the gradient of the segment between Z1 and Z2. If the change in the gradient is lower than a threshold value, then Z1 can be removed from the set of intermediate nodes, otherwise Z1 is marked as a significant node. The segment gradient can be determined from the altitude difference between two nodes. The difference in the altitude between Z1 and K1, i.e. the gradient of the segment between K1 and Z2, is thus compared with the difference in the altitude between Z2 and Z1, i.e. the gradient of the segment between Z2 and Z1. The change in the gradient is here lower than the threshold value Z1 can therefore be removed from the set of intermediate nodes.

Z2 is now examined. The segment gradient of the segment between K1 and Z2 and the segment gradient of the segment between Z2 and Z3 are considered here. The change of these segment gradients is again lower than the threshold value. Z2 can therefore be removed from the set of intermediate nodes.

Z3 is now examined. The segment gradient of the segment between K1 and Z3 and the segment gradient of the segment between Z3 and Z4 are considered here. The change of these segment gradients is again lower than the threshold value. Z3 can therefore be removed from the set of intermediate nodes.

Z5 is now examined. Z4 was already marked as a significant node. The segment gradient of the segment between Z4 and Z5 and the segment gradient of the segment between Z5 and Z6 are considered here. This time the change of these segment gradients is above the threshold value, since the altitude profile has a strong downward gradient. Z5 is therefore marked as a significant intermediate node, and must not be removed during later application of the Douglas-Peucker algorithm with reference to the attributes of longitude and latitude.

Z6 is now examined. The segment gradient of the segment between Z5 and Z6 and the segment gradient of the segment between Z6 and Z7 are considered here. The change of these segment gradients is again above the threshold value, since the altitude profile here has a transition from a strong to a weak downward gradient, Z6 is therefore marked as a significant intermediate node, and must not be removed during later application of the Douglas-Peucker algorithm with reference to the attributes of longitude and latitude.

Z7 is now examined. The segment gradient of the segment between Z6 and Z7 and the segment gradient of the segment between Z7 and Z8 are considered here. The change of these segment gradients is again lower than the threshold value. Z7 can therefore be removed from the set of intermediate nodes.

Z8 is now examined. The segment gradient of the segment between Z7 and Z8 and the segment gradient of the segment between Z8 and K2 are considered here. The change of these segment gradients is again lower than the threshold value. Z8 can therefore be removed from the set of intermediate nodes.

A summary of the above method is illustrated in FIG. 4 c).

The result of the method is illustrated in FIG. 4 d). The intermediate nodes Z4, Z5 and Z6 remain, which model the altitude profile with sufficient accuracy for an electronic horizon.

As an alternative to the method described above, the Douglas-Peucker algorithm can also be applied first to the altitude profile, i.e. with respect to the attributes altitude and the projection onto the latitude. Z4 is also first identified as a significant node, since a direction change of the altitude or the segment gradient is present here. The first approximation here is consequently not a segment between K1 and K2, but a start is made with the second approximation which is given by a first segment between K1 and Z4 and a second segment between Z4 and K2. To check whether this approximation is adequate, the intermediate node from amongst the intermediate nodes Z1, Z2 and Z3 that has the greatest distance from the segment between K1 and Z4 is searched for. This is Z1. Since the distance is smaller than a threshold value, the approximation is adequate, and Z1, Z2, and Z3 can be removed. To check whether the second approximation is adequate, the intermediate node from amongst the intermediate nodes Z5, Z6, Z7 and Z8 that has the greatest distance from the segment between Z4 and K2 is furthermore searched for. This is Z6. Since the distance is greater than the threshold value, the second approximation through the segment between Z4 and K2 is not adequate.

The third approximation is thus a segment between K1 and Z4, a segment between Z4 and Z6, and a segment between Z6 and K2. To check whether this approximation is adequate, Z5 is examined to see whether its distance from the segment between Z4 and Z6 exceeds a threshold value. Since that is the case here, the approximation is not adequate. The segment between Z4 and Z6 must consequently be further refined into two segments, one between Z4 and Z5 and one between Z5 and Z6. It is furthermore necessary to check whether the segment between Z6 and K2 must be refined further. For this purpose an examination is made as to which of the intermediate points Z7 and Z8 has the greatest distance from the segment between Z5 and K2. This is Z7. Since the distance does not exceed a threshold value, Z7 and Z8 can be deleted. This results in a fourth approximation with a segment between K1 and Z4, a segment between Z4 and Z5, a segment between Z5 and Z6, and a segment between Z6 and K2.

Z4, Z5 and Z6 thus remain as significant intermediate nodes which must not be removed during later application of the Douglas-Peucker algorithm with reference to the attributes of longitude and latitude.

Figure 5:
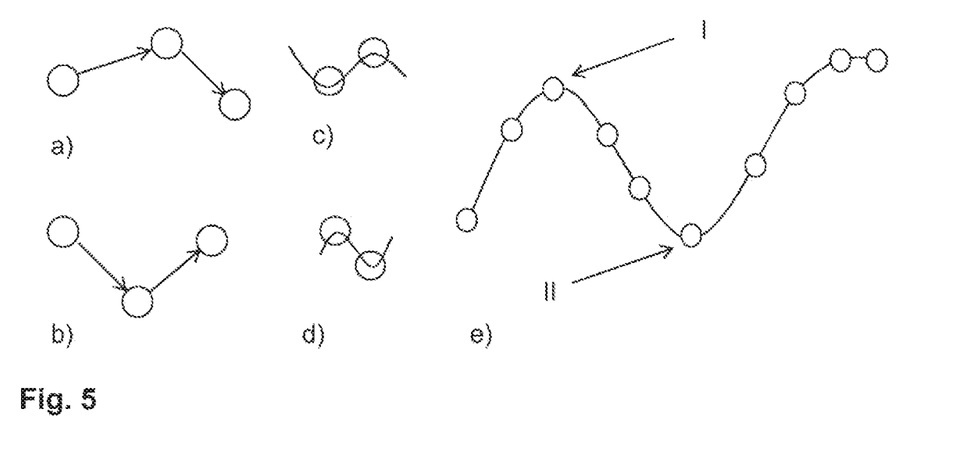
FIG. 5 shows examples for direction changes for different attributes.

FIG. 5 graphically clarifies once again the direction change with respect to the attributes of gradient, curve-radius and altitude.

FIG. 5 a) shows a direction change of the gradient attribute from an upward gradient to a downward gradient. FIG. 5 b) shows a direction change with reference to the gradient attribute from a downward gradient to an upward gradient. FIG. 5 c) shows a direction change with respect to the attribute of curve-radius from a curve-radius to the left to a curve-radius to the right. FIG. 5 d) shows a direction change with respect to the attribute of curve-radius from a curve-radius to the right to a curve-radius to the left. FIG. 5 e) shows a direction change with reference to the attribute of altitude from a rising altitude to a falling altitude, and from a falling altitude to a rising altitude.

Figure 6:
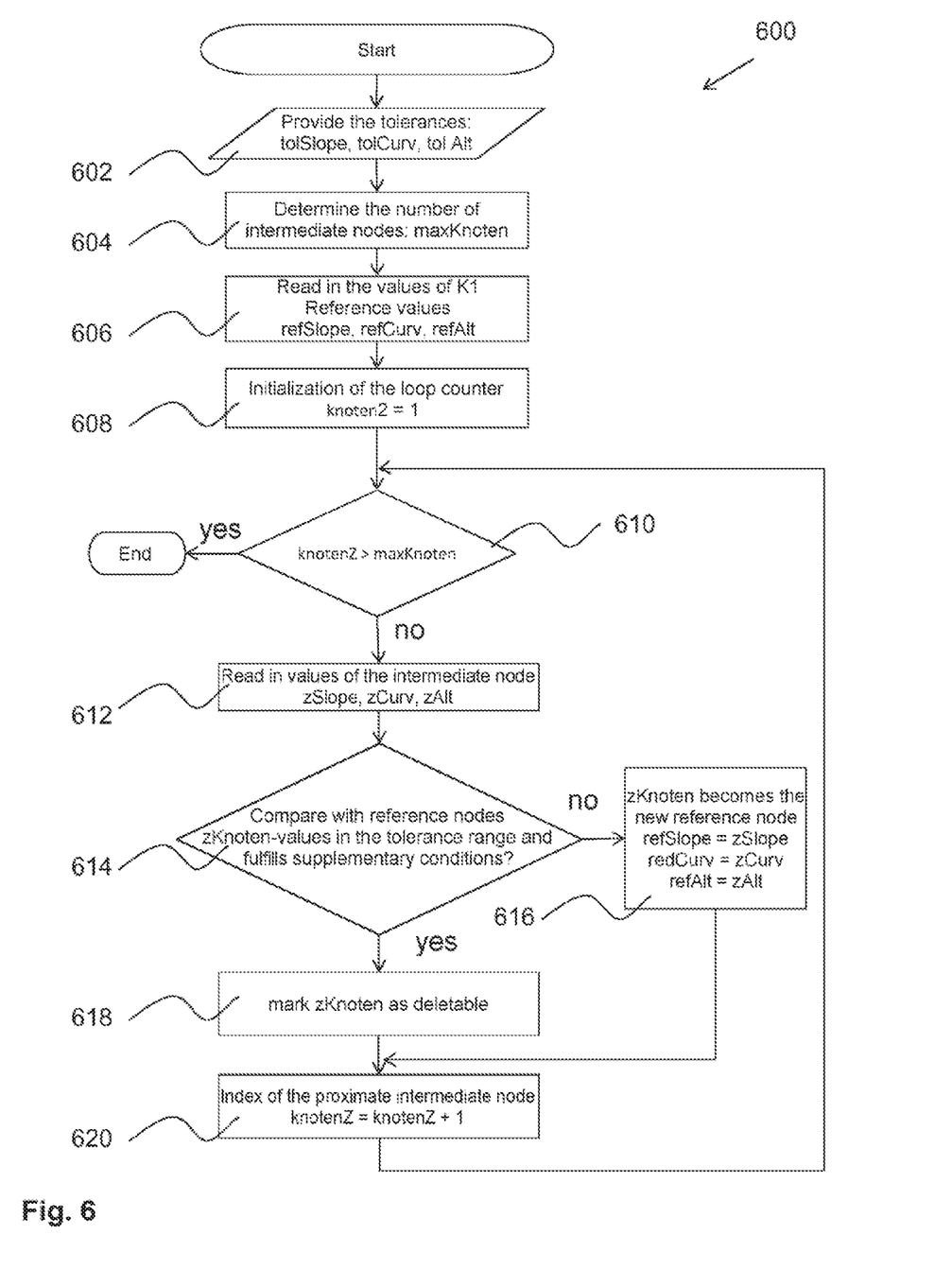
FIG. 6 shows a flow diagram/program flow chart of the method.

An embodiment of the method is explained below with reference to the flow diagram in FIG. 6.

In step 602 the tolerances for the gradient tolSlope, the curvature tolCurv and the altitude tolAlt are made available. In step 604 the number of intermediate nodes is determined. This is identified as maxKnoten. Reference values for the gradient refSlope, the curvature refCurv and the altitude refAlt are read in for the starting node K1 in step 606. In step 608, a loop counter, which operates over the number of intermediate nodes with index knotenZ, is initialized with the value one. A check is performed in step 610 as to whether the maximum number of intermediate nodes has already been exceeded. If this is the case the method terminates. If this is not the case, the zSlope for the gradient, zCurv for the curvature and zAlt for the altitude are read in for the respective intermediate node. In step 614, these values are compared with the values of the reference node, and a check is made as to whether a deviation is still within the tolerance range.

For this purpose a check is made as to whether the absolute magnitude of the difference of the gradient, value of the intermediate node and the gradient value of the reference node lies below the tolerance for the gradient: abs(zSlope−refSlope)<toleranceSlope.

For this purpose a check is made as to whether the absolute magnitude of the difference of the curvature value of the intermediate node and the curvature value of the reference node lies below the tolerance for the curvature: abs(zCurvature−refCurvature)<toleranceCurvature.

For this purpose a check is made as to whether the absolute magnitude of the difference of the altitude value of the intermediate node and the altitude value of the reference node lies below the tolerance for the altitude: abs(zAltitude−refAltitude)<toleranceAltitude.

In step 614, an additional check is also made as to whether the following supplementary conditions relating to a direction change of the gradient, curvature and altitude are satisfied:

(((zSlope>0 and refSlope>0) or (zSlope<0 and refSlope<0) or (zSlope=0 and refSlope=0)) and ((zCurvature>0 and refCurvature>0) or (zCurvature<0 and refCurvature<0) or (zCurvature=0 and refCurvature=0)) and ((zAltitude>0 and refAltitude>0) or (zAltitude<0 and refAltitude<0) or (zAltitude=0 and refAltitude=0)))

"And" and or in the above combinations refer to logical AND and logical OR.

If the supplementary conditions are satisfied, there is no direction change.

If the comparison values for gradient, curvature and altitude lie in the tolerance range, and if the supplementary conditions are satisfied, then in step 618 the relevant intermediate node is marked as deletable, i.e. it can be removed from the set of intermediate nodes. If this is not the case, the node is significant, and it is specified as a reference node for the next pass through the loop in step 616.

In step 620 the index of the intermediate node is increased by one, and the loop is started again at step 610.

The aspects and forms of embodiment of the method for reducing intermediate nodes described above can be executed either on a processor of an ADAS architecture installed or located in a target, for example in a vehicle, in order to calculate an ADAS map for an eHorizon application, or on an external server, i.e. a dedicated ADAS map is calculated in advance. The advance calculation of the ADAS map on an external server and subsequent transfer to the target have the advantage that computing time is saved on the target, and the size of the map database on the target can be reduced.

The invention claimed is:

1. A method for reducing a complexity of map data of a geographic database that is associated with a navigation system of a vehicle by reducing intermediate nodes in a polygonal chain of the map data with one or a plurality of intermediate nodes of a set of intermediate nodes between a starting node and an end node, wherein, in addition to the attributes of longitude and latitude, at least one further attribute with an attribute value and an attribute direction of a set of further attributes is assigned to the starting node, the end node and every intermediate node of the set of intermediate nodes of the map data and for using the reduced-complexity map data to control motion of the vehicle, the method comprising:
  in one or more processors, for each intermediate node, starting from the starting node:
    comparing the attribute direction of the at least one further attribute of an intermediate node with the attribute direction of the at least one further attribute of the immediately preceding node;
    marking the intermediate node as a significant node if the comparison yields a direction change of the attribute direction;
    applying a line generalization method with reference to the longitude and latitude attributes, wherein the intermediate nodes that are marked as significant nodes may not be removed;
  wherein, prior to application of the line generalization method, in one or more processors, for each intermediate node of the set of intermediate nodes, starting from the starting node;
    determining a difference between the value of the at least one further attribute of an intermediate node and the value of the at least one further attribute of a preceding node, wherein the preceding node is a proximate preceding starting node or a proximate preceding intermediate node that has not yet been removed;
    marking the intermediate node as a significant node if the difference exceeds a threshold value, otherwise removing the intermediate node from the set of intermediate nodes; and
  using the significant nodes, but not the removed intermediate nodes, of the set of intermediate nodes between the starting node and the end node to control motion of the vehicle.

2. The method as claimed in claim 1, also comprising: prior to application of the line generalization method, in one or more processors, for each intermediate node of the set of intermediate nodes, starting from the starting node: determining a first difference between the value of the at least one further attribute of an intermediate node and the value of the at least one further attribute of a preceding node, wherein the preceding node is a proximate preceding starting node or a proximate preceding intermediate node that has not been removed; determining a second difference between the value of the at least one further attribute of the immediately succeeding node and the value of the at least one further attribute of the intermediate node; determining a difference between the first difference and the second difference; and marking the intermediate node as a significant node if the difference exceeds a threshold value, otherwise removing the intermediate node.

3. The method as claimed in claim 1, also comprising: prior to application of the line generalization method, in one or more processors, for each intermediate node of the set of intermediate nodes, starting from the starting node: determining a first difference between the value of the at least one further attribute of an intermediate node and the value of the at least one further attribute of a preceding node, wherein the preceding node is a proximate preceding starting node or a proximate preceding intermediate node that has not been removed; determining a second difference between the value of the at least one further attribute of the immediately succeeding node and the value of the at least one further attribute of the preceding node; determining a difference between the first difference and the second difference; and marking the intermediate node as a significant node if the third difference exceeds a threshold value, otherwise removing the intermediate node.

4. The method as claimed in claim 3, wherein the at least one further attribute is a gradient or an altitude or a curve-radius.

5. The method as claimed in claim 4, wherein the set of attributes comprises two attributes, and wherein the marking of the intermediate node as a significant node and the removal of the intermediate node take place with reference to the two attributes.

6. The method as claimed in claim 1, comprising: a method for reducing intermediate nodes in a polygonal chain with one or a plurality of intermediate nodes of a set of intermediate nodes between a starting node and an end node, wherein, in addition to the attributes of longitude and latitude, at least one further attribute with an attribute value and an attribute direction of a set of further attributes is assigned to the starting node, the end node and every intermediate node of the set of intermediate nodes, the method comprising:
  in one or more processors, for each intermediate node, starting from the starting node:
    comparing the attribute direction of the at least one further attribute of an intermediate node with the attribute direction of the at least one further attribute of the immediately preceding node;
    marking the intermediate node as a significant node if the comparison yields a direction change of the attribute direction;
    applying a line reduction method with reference to the at least one further attribute, and a projection of the polygonal chain either onto the longitude or the latitude, wherein the intermediate nodes marked as significant must not be removed;
    marking intermediate nodes remaining after application of the line reduction method as significant nodes; and
    applying the line generalization method with reference to the longitude and latitude attributes, wherein the intermediate nodes that are marked as significant nodes must not be removed.

7. The method as claimed in claim 6, wherein the line generalization method is the Douglas-Peucker algorithm.

8. The method as claimed in claim 7, wherein the polygonal chain is a segment of a road network.

9. A device comprising a processor configured to execute a method for reducing a complexity of map data of a geographic database that is associated with a navigation system of a vehicle by reducing intermediate nodes in a polygonal chain of the map data with one or a plurality of intermediate nodes of a set of intermediate nodes between a starting node and an end node, wherein, in addition to the attributes of longitude and latitude, at least one further attribute with an attribute value and an attribute direction of a set of further attributes is assigned to the starting node, the end node and every intermediate node of the set of intermediate nodes of the map data and for using the reduced-complexity map data to control motion of the vehicle, the method comprising:

in one or more processors, for each intermediate node, starting from the starting node:
comparing the attribute direction of the at least one further attribute of an intermediate node with the attribute direction of the at least one further attribute of the immediately preceding node;
marking the intermediate node as a significant node if the comparison yields a direction change of the attribute direction;
applying a line generalization method with reference to the longitude and latitude attributes, wherein the intermediate nodes that are marked as significant nodes may not be removed;
wherein, prior to application of the line generalization method, in one or more processors, for each intermediate node of the set of intermediate nodes, starting from the starting node;
determining a difference between the value of the at least one further attribute of an intermediate node and the value of the at least one further attribute of a preceding node, wherein the preceding node is a proximate preceding starting node or a proximate preceding intermediate node that has not yet been removed;
marking the intermediate node as a significant node if the difference exceeds a threshold value, otherwise removing the intermediate node from the set of intermediate nodes; and
using the significant nodes, but not the removed intermediate nodes, of the set of intermediate nodes between the starting node and the end node to control motion of the vehicle.

10. The device as claimed in claim 9, also comprising: prior to application of the line generalization method, in one or more processors, for each intermediate node of the set of intermediate nodes, starting from the starting node: determining a first difference between the value of the at least one further attribute of an intermediate node and the value of the at least one further attribute of a preceding node, wherein the preceding node is a proximate preceding starting node or a proximate preceding intermediate node that has not been removed; determining a second difference between the value of the at least one further attribute of the immediately succeeding node and the value of the at least one further attribute of the intermediate node; determining a difference between the first difference and the second difference; and marking the intermediate node as a significant node if the difference exceeds a threshold value, otherwise removing the intermediate node.

11. The device as claimed in claim 9, also comprising: prior to application of the line generalization method, in one or more processors, for each intermediate node of the set of intermediate nodes, starting from the starting node: determining a first difference between the value of the at least one further attribute of an intermediate node and the value of the at least one further attribute of a preceding node, wherein the preceding node is a proximate preceding starting node or a proximate preceding intermediate node that has not been removed; determining a second difference between the value of the at least one further attribute of the immediately succeeding node and the value of the at least one further attribute of the preceding node; determining a difference between the first difference and the second difference; and marking the intermediate node as a significant node if the third difference exceeds a threshold value, otherwise removing the intermediate node.

12. The device as claimed in claim 11, wherein the at least one further attribute is a gradient or an altitude or a curve-radius.

13. The device as claimed in claim 12, wherein the set of attributes comprises two attributes, and wherein the marking of the intermediate node as a significant node and the removal of the intermediate node take place with reference to the two attributes.

14. The device as claimed in claim 9, comprising: a method for reducing intermediate nodes in a polygonal chain with one or a plurality of intermediate nodes of a set of intermediate nodes between a starting node and an end node, wherein, in addition to the attributes of longitude and latitude, at least one further attribute with an attribute value and an attribute direction of a set of further attributes is assigned to the starting node, the end node and every intermediate node of the set of intermediate nodes, the method comprising:

in one or more processors, for each intermediate node, starting from the starting node:
comparing the attribute direction of the at least one further attribute of an intermediate node with the attribute direction of the at least one further attribute of the immediately preceding node;
marking the intermediate node as a significant node if the comparison yields a direction change of the attribute direction;
applying a line reduction method with reference to the at least one further attribute, and a projection of the polygonal chain either onto the longitude or the latitude, wherein the intermediate nodes marked as significant must not be removed;
marking intermediate nodes remaining after application of the line reduction method as significant nodes; and
applying the line generalization method with reference to the longitude and latitude attributes, wherein the intermediate nodes that are marked as significant nodes must not be removed.

15. The device as claimed in claim 14, wherein the line generalization method is the Douglas-Peucker algorithm.

16. The device as claimed in claim 15, wherein the polygonal chain is a segment of a road network.

* * * * *